March 7, 1961 M. E. ROCHÉ 2,973,546
PLASTIC CASTER SOCKET
Filed July 24, 1958
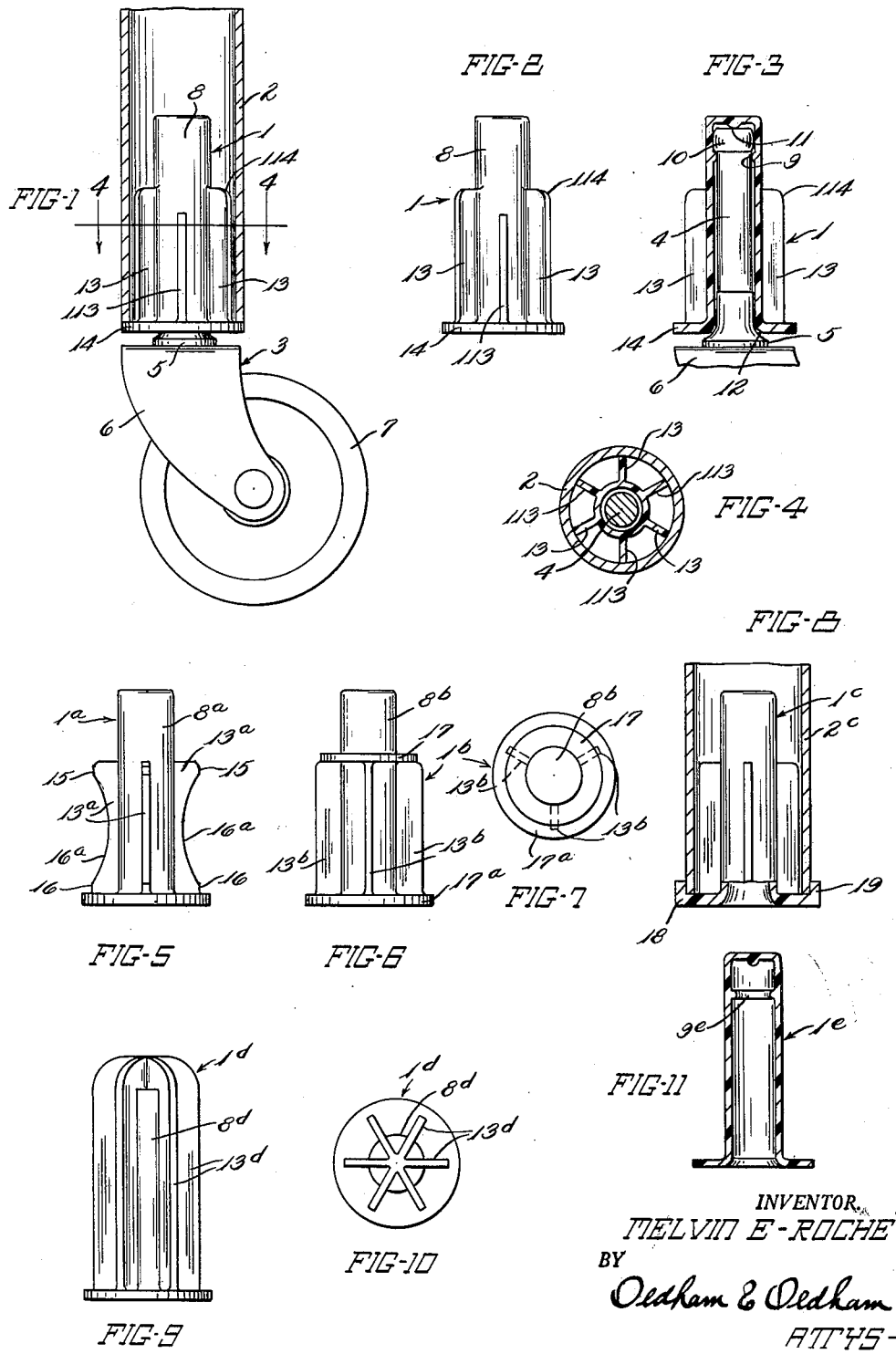
INVENTOR.
MELVIN E. ROCHÉ
BY
Oldham & Oldham
ATTYS- United States Patent Office 2,973,546
Patented Mar. 7, 1961

2,973,546
PLASTIC CASTER SOCKET
Melvin E. Roché, Berea, Ohio, assignor to Harvard Manufacturing Company, Cleveland, Ohio, a corporation of Ohio
Filed July 24, 1958, Ser. No. 750,666
1 Claim. (Cl. 16—43)

The present invention relates to caster sockets adapted to retain and permit release of a caster stem, and especially to a plastic caster socket of the type supported in a receiving member.

Heretofore substantially all casters have been made with metal caster sleeves or sockets of generally tubular form adapted to receive and hold the caster stem therein. Inasmuch as these metal sleeves, or sockets had to be able to expand as the top or lock ring portion of the caster stem is snapped or forced past a holding ring, lugs or similar means on the caster socket, the sleeve has been of such construction that it can temporarily be slightly expanded. Frequently some type of a longitudinal split has been provided in the caster sleeve. Because of the expansion action required, it is necessary to hold the socket receiving member to close tolerances in order to avoid undue pressure in assembling the caster stem.

It also has been noted that even in the office furniture field where casters are provided with support bearings and relatively expansive caster units are used in an office chair, for example, the casters provided therein make appreciable noise as the chair is moved from place to place. In hospitals, trays, carts and other articles used for wheeling goods, food, or patients around likewise may have expensive caster means therein but still the bearings make quite a bit of noise as the structures that they support are moved about on such support casters.

The general object of the present invention is to provide a novel and improved plastic caster socket characterized by the one piece molded construction thereof and by the ability of the socket to be of sturdy tubular construction but yet to have desirable resiliency provided thereby.

Another object of the invention is to provide a novel and improved caster construction of quieter operation than prior constructions.

Another object of the invention is to provide a caster socket construction which may have either top or bottom bearing support action provided thereby and wherein some shock absorbing action is provided by inherent resiliency in the caster socket.

Yet another object of the invention is to provide a molded plastic caster socket having integral radially directed ribs thereon for press fit engagement with a receiving hole in a metal support leg, or other equivalent member.

Further objects of the invention are to provide a caster socket wherein no grease is required in the caster to caster socket connection to provide inherent lubrication action therebetween; to provide a plurality of support flanges extending from a center cylindrical caster stem receiving member so that the radial flanges can resiliently engage a support member; to avoid the use of ball bearings in caster sockets and caster means for load support action; to provide discs and flanges on a caster socket at one or more axially spaced portions thereof to reenforce the caster socket against axial bending and other forces applied thereto; to eliminate metal to metal contact of caster sockets with associated positioning means; and to provide a caster socket that avoids the several relatively expensive forming or shaping operations required in securing the components of conventional metal caster sockets and positioning means together.

The foregoing and other objects and advantages of the invention will be made more apparent as the specification proceeds.

When referring to a plastic caster socket in the present invention, one suitable plastic material from which such caster socket can be made is nylon, whereas other suitable plastic materials, such as Teflon, or other hard, low friction coefficient type of plastic means can be used in making the caster socket of the invention.

In the accompanying drawings, currently preferred embodiments of the present invention are shown, and in the drawings:

Fig. 1 is an elevation, partially broken away and shown in vertical section, of a novel caster socket of the invention in operative engagement with a caster positioning leg and a caster;

Fig. 2 is an elevation of the novel caster socket of the invention;

Fig. 3 is a vertical section of the novel plastic caster socket of Fig. 2 with the position of a caster stem being indicated in broken lines;

Fig. 4 is a horizontal section taken on line 4—4 of Fig. 1;

Fig. 5 is an elevation of a modified caster socket of the invention;

Fig. 6 is an elevation of a further modification of the novel caster socket of the invention;

Fig. 7 is a plan view of the caster socket of Fig. 6;

Fig. 8 is an elevation, partially broken away and shown in vertical section, of a further modification of the caster socket of the invention shown in operative engagement with a caster positioning leg;

Fig. 9 is an elevation of yet a further modified type of a caster socket of the invention;

Fig. 10 is a top plan of the caster socket of Fig. 9; and

Fig. 11 is a vertical section through yet another modification of the caster socket of the invention.

When referring to corresponding members shown in the drawings and referred to in the specification, corresponding numerals are used to facilitate comparison therebetween.

Attention now is particularly directed to the structure shown in the drawings, and a caster socket of the invention is indicated as a whole by the numeral 1. Such caster socket 1 is snugly positioned within the bore of a tubular support leg 2 by press fit engagement therewith. The caster socket 1 is shown positioning a conventional caster 3 in operative engagement with the support leg 2. This caster 3 has a caster stem 4 of conventional construction received in the caster socket 1. The caster stem 4 in turn has a flange 5 at the lower end thereof immediately above the caster horn 6 on which a caster wheel 7 is suitably journalled.

It is an important feature of the present invention that the caster socket 1 is made from suitable plastic material and is of a unitary, molded construction. This caster socket 1 includes a substantially cylindrical center sleeve or section 8 that has a radially inwardly extending rib 9 provided in the bore of the center sleeve 8 adjacent but spaced from the upper end of such center sleeve. This rib 9 has a smaller inner diameter than the outer diameter of an enlarged convexly shaped head 10 provided on the caster stem 4. This head 10 is of conventional construction and is adapted to be snapped, or slid past the rib 9 to retain the caster stem 4 and caster socket 1 in firm operative engagement after the head section 10 has been forced by the rib 9. The rib 9 is of such internal diameter that the inherent flexibility in the caster socket 1 of the rib itself and of the center sleeve 8 will permit the smoothly tapered, generally oval-shaped surface of the head 10 to be slid into and past engagement with the rib 9 but with the rib 9, which may be continuous, or discontinuous circumferentially, serving to recover fully when aligned with an undercut portion of the caster stem 4 to prevent any ready disengagement of the caster stem from the center sleeve 8. It also should be noted that the center sleeve 8 has an axially inwardly extending dimple or protuberance 11 on the top thereof for resilient, load bearing engagement with the top of the caster stem 4 after such stem has been engaged with the center sleeve 8.

It should be noted that the center sleeve 8, at its lower end may have a radiused entrance 12 that may be adapted for contact with the flared portion of the stem 4 above the flange 5. In one embodiment, the caster socket is adapted to provide a top bearing engagement between the dimple 11 and the caster stem 4; and, as an alternative construction, a bottom bearing engagement with the caster socket can be formed by means of the seat 12 in the center sleeve 8 engaging the flare of the flange 5 under excess load conditions, or if the protuberance 11 is omitted. Hence, a top or bottom load support action is normally provided for the caster 3, by means of the caster socket 1.

In order to provide resiliency in the caster socket 1 and to aid the caster socket 1 in being a caster adapter and/or positioning member as well as a caster socket, the center sleeve 8 is provided with a plurality of radially outwardly extending ribs, or flanges 13 thereon. These flanges 13 are of a uniform radial length throughout and normally are of slightly larger overall diameter than the inner diameter of the bore of the support leg 2. In the caster socket 1, axially shorter ribs 113 are provided diametrically opposed to the longer ribs 13 to avoid simultaneous engagement of diametrically opposed portions of the caster socket with the support leg 2 and facilitate initial engagement therebetween. The upper ends of the ribs 13 are radiused at 114 to aid in engaging the caster socket with the bore of the support leg 2. A press fit is obtained between the caster socket 1 and the support leg 2 to retain such caster socket firmly in position when once forced into the support leg. The caster socket 1 also has a disc-like bottom flange 14 provided thereon extending radially from the center sleeve 8 and normally formed integrally with lower ends of the flanges 13 and the lower end of the center sleeve 8. Such end flange 14 protrudes radially beyond the flanges 13 and usually abuts against the lower end of the support leg 2 to limit axially inward positioning movement of the caster socket in the support leg.

Because of the inherent low frictional characteristics of a metal stem on the plastic material used in forming the caster socket 1, a smooth journalled seat is provided for the caster stem 4 for any necessary rotation of the caster 3 as a unit with relation to the caster socket and other support means provided. Such bearing is very smooth in operation and in practical effect, is noiseless. The bearing construction provided will not require any maintenance thereof, or lubricant supply thereto throughout a long service life.

It also should be noted that the caster socket 1 can be made from a relatively small amount of plastic material which forms a relatively large diameter connector or adapter unit for positioning the caster 3 in a relatively large diameter support leg 2. The caster socket 1, being of unitary construction, is easily assembled in a support leg 2 and the manufacture of the caster socket is relatively simple because it can be made by molding and can be turned out in large quantities at relatively low cost.

It should be realized that any desired number of the flanges 13 and 113 can be provided in the caster socket of the invention but that six such flanges, as shown, give very effective support action for positioning the caster socket in the support leg. For stability, three or more flanges are required.

In a modified type of a caster socket 1a shown in Fig. 5, the modified socket includes a plurality of flanges 13a provided on the center sleeve 8a, and wherein the flanges 13a have axially extending outer edges indicated at 15 and 16 at both the upper and lower ends, respectively, thereof. The remainder surfaces 16a of the axially outer edges of the flanges 13 are of concave shape. This facilitates the insertion of the caster socket 1a into engagement with the support leg provided but yet furnishes effective bearing and mounting contact between the caster socket and the support leg.

A modified type of a caster socket 1b is shown in Figs. 6 and 7 of the drawings; in this instance, the caster socket 1b is quite similar to the socket 1 shown in Figs. 1 through 3 of the drawings. However, center sleeve 8b of the caster socket 1b has ribs 13b therein like those shown in the caster socket 1. An annular reenforcing flange 17 is made as a unit with the upper end of these ribs 13b. This flange 17 preferably blends smoothly into the upper ends of the flanges or ribs 13b and combines with a lower flange 17a so that a sturdy truss-like structure is provided in the integral molded caster socket. It should be noted that the flange 17 preferably is of slightly smaller outer diameter than the effective outer diameter of the ribs 13b. Hence, the flange 17 is of a diameter as to engage smoothly and snugly with the bore of a support leg for the caster socket of the invention for good secure seating engagement therewith.

A further modification of the caster socket of the invention is shown in Fig. 8 wherein caster socket 1c is illustrated and it has a cup-shaped lower end flange 18 thereon. This flange 18 is formed integrally with the remainder of the molded caster socket 1c but with an upwardly extending end section 19 on the end flange 18 being shaped for snug engagement with the lower end of a support leg 2c present in this construction. Thus, further reenforcing and tight engagement action is secured between the caster socket and the support leg 2c.

Another modified type of a caster socket is shown at 1d in Figs. 9 and 10 of the drawings. In this embodiment of the invention, a center sleeve 8d is provided with a plurality of the support flanges or ribs 13d that extend radially therefrom. However, in this embodiment of the invention, the ribs or flanges 13d extend up around or over the top of the center sleeve 8d by forming the ribs 13 of diametrical shape, or contour. Obviously, the ribs terminate where they blend integrally into the periphery of the center sleeve 8d but with the ribs extending over the upper end of said center sleeve section and extending substantially as far axially beyond the upper end of the center sleeve 8d as the radial width or projection of the ribs or flanges 13d from the center sleeve. Thus again a further type of a reenforced caster socket of the invention is disclosed. It could be considered that six ribs, all extending radially of the caster socket, are provided in this embodiment, or they could be considered to be three diametrically extending ribs. Other numbers of ribs may be used. Hence, secure engagement of the caster socket with its support leg would be provided and again the caster socket would be given a press fit with any support leg in which it would be positioned. Thus, the caster sockets of the invention would have permanent engagement with the support leg unless forcibly pulled or drawn therefrom.

Another important feature of the present invention is that the caster socket 1 does not require any pointed holding ribs or teeth to extend axially therefrom. In many prior constructions, especially where casters are to be engaged with wood support legs, the casters have been held in position by caster sleeves having a series of axially projecting teeth for driving engagement with the wooden chair leg or the like. After a period of use, such wooden legs frequently are chewed up by the caster sleeve which works itself loose and the caster and caster sleeve drop from the article of furniture with which the caster has been engaged.

It should be noted that in some instances the caster socket 1 can be made without any of the ribs 13 being provided thereon and hence a caster socket 1e is shown in Fig. 11. Such caster socket has sufficient inherent resiliency as to be driven into a caster support leg or other article to be secured in engagement therewith by a press fit. Likewise, the inherent resiliency of the molded plastic caster socket 1e will permit a rib 9e, or equivalent member thereon to be deformed slightly to have the head 10 of a caster stem to be forced thereby for effective operative engagement between the caster socket and a caster stem. Such rib 9e may be continuous, or discontinuous, as desired and a similar rib may be provided in any embodiments of the invention.

From the foregoing, it is believed that a novel and improved type of a plastic caster socket has been provided. The caster socket can provide either top and/or bottom load support engagement with the caster stem. This socket can be made relatively inexpensively and the socket will have uniform dimensions even though made in large production quantities. The caster socket is quite in operation and provides improved performance over a long service life. The caster socket is useful with any desired article of furniture, such as office furniture, hospital carts, beds and bedframes, or other equivalent furniture articles and effectively secures a caster to even a leg with a relatively large diameter caster receiving hole or bore therein. Thus, it is believed that the objects of the invention have been achieved.

While several complete embodiments of the invention have been disclosed herein, it will be appreciated that modification of these particular embodiments of the invention may be resorted to without departing from the scope of the invention as defined in the appended claim.

What is claimed is:

A caster socket for use with a caster support leg having a center bore and an exposed lower end and a caster having a caster stem with an enlarged head thereon, the plastic caster socket being of a size for a press fit engagement with the support leg center bore, said caster socket including a center sleeve having radially inwardly projecting rib means thereon adjacent but spaced from the upper end thereof, said center sleeve having a closed upper end with an axially inwardly extending support protuberance thereon, a bottom flange extending radially from said center sleeve and adapted to engage the lower end of said support leg, and a plurality of radially directed, axially extending ribs formed integrally with said bottom flange and center sleeve and adapted to have tight engagement with said support leg bore for positioning therein, said axially extending ribs being formed in two sets and with the ribs of one set being longer than the ribs in the other set of ribs to extend nearer to said closed upper end, the caster stem head being adapted to be forced past the said rib means to be positioned axially within said rib means on said center sleeve, the ribs of said set of longer ribs being diametrically opposed to the ribs of said set of shorter ribs.

References Cited in the file of this patent
UNITED STATES PATENTS

| | | |
|---|---|---|
| 918,083 | Palmer | Apr. 13, 1909 |
| 1,202,274 | Diss | Oct. 24, 1916 |
| 1,466,531 | Johnson | Aug. 28, 1923 |
| 1,693,657 | Noelting | Dec. 4, 1928 |
| 1,929,743 | Jarvis | Oct. 10, 1933 |
| 2,246,086 | Austin | June 17, 1941 |
| 2,289,873 | Claud-Mantle | July 14, 1942 |
| 2,546,492 | Booth | Mar. 27, 1951 |